United States Patent
Goegge et al.

(10) Patent No.: US 8,826,743 B2
(45) Date of Patent: Sep. 9, 2014

(54) MAGNETIC INDUCTIVE FLOW METER HAVING MAGNETIC POLES DISTRIBUTING UNIFORM MAGNETIC FIELD LINES OVER THE ENTIRE POLE SURFACE

(75) Inventors: Joern Goegge, Oberfloersheim (DE); Michael Zimmerman, Addison, PA (US); Raymond Pstir, Irwin, PA (US)

(73) Assignee: Sensus Spectrum LLC, Raleigh, NC (US)

( * ) Notice: Subject to any disclaimer, the term of this patent is extended or adjusted under 35 U.S.C. 154(b) by 426 days.

(21) Appl. No.: 13/323,235

(22) Filed: Dec. 12, 2011

(65) Prior Publication Data

US 2012/0146634 A1 Jun. 14, 2012

Related U.S. Application Data

(63) Continuation of application No. PCT/EP2010/003503, filed on Jun. 11, 2010.

(30) Foreign Application Priority Data

Dec. 19, 2009 (DE) ............... 20 2009 017 274 U
Dec. 19, 2009 (DE) ............... 20 2009 017 275 U

(51) Int. Cl.
*G01F 1/58* (2006.01)

(52) U.S. Cl.
CPC ............ *G01F 1/588* (2013.01); *G01F 1/586* (2013.01); *G01F 1/58* (2013.01)
USPC ..................................... 73/861.12

(58) Field of Classification Search
None
See application file for complete search history.

(56) References Cited

U.S. PATENT DOCUMENTS 3,274,831 A    9/1966  Cushing
4,428,241 A    1/1984  Davis et al.
4,614,121 A *  9/1986  Hansen et al. ............ 73/861.12
4,641,537 A *  2/1987  Hansen et al. ............ 73/861.12
4,932,268 A    6/1990  Hafner
5,307,687 A    5/1994  Arai et al.
5,503,026 A    4/1996  Böhm et al.
5,852,362 A   12/1998  Batenburg et al.
6,260,420 B1   7/2001  Ketelsen et al.
7,251,877 B2   8/2007  Thai et al.
7,287,435 B2* 10/2007  Ketelsen .................. 73/861.12
7,472,605 B2   1/2009  Knill et al.
8,006,569 B2   8/2011  GÖgge et al.

FOREIGN PATENT DOCUMENTS

EP    0 309 932 A1   4/1989
EP    0 626 567 A1  11/1994
GB    2 269 443 A    2/1994
GB    2 403 016 A   12/2004

* cited by examiner

*Primary Examiner* — Harshad R Patel
(74) *Attorney, Agent, or Firm* — Muncy, Geissler, Olds & Lowe, P.C.

(57) ABSTRACT

A magnetically inductive flowmeter having a pressure-resistant housing made of plastic, comprising a measuring unit with a measuring channel of rectangular cross-section which is flown through by the measurement fluid, a channel wall, two opposing magnet poles at the channel wall, an electromagnet with magnet coil and magnet core for generating a magnetic alternating field as well as two opposing measurement electrodes in the channel wall. The magnet poles are punched, bent and folded parts made of electric sheet metal in the form of an elongate strip with mutually distanced surface elements formed thereon. The elongate strip forms a double web after folding. The surface elements form magnet pole surfaces after bending. The double web and the magnet pole surfaces form the magnet pole. The double web is located on the rear side of the magnet pole.

10 Claims, 1 Drawing Sheet

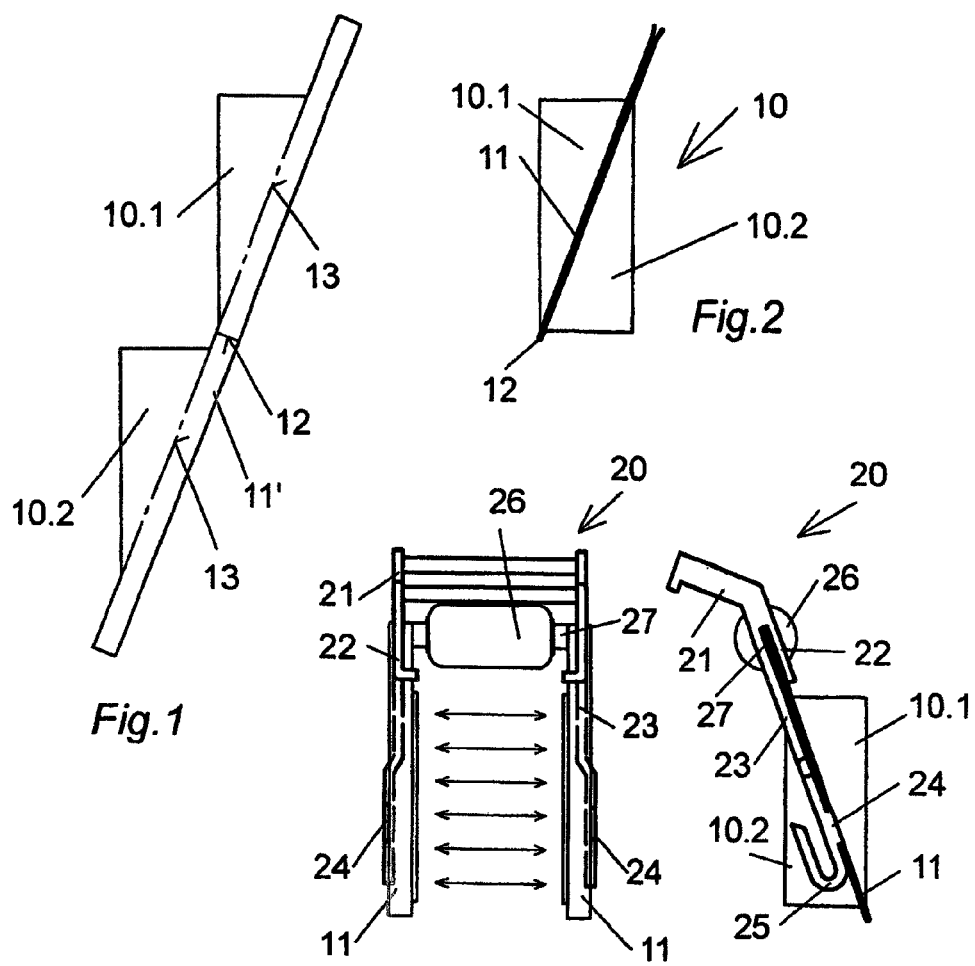
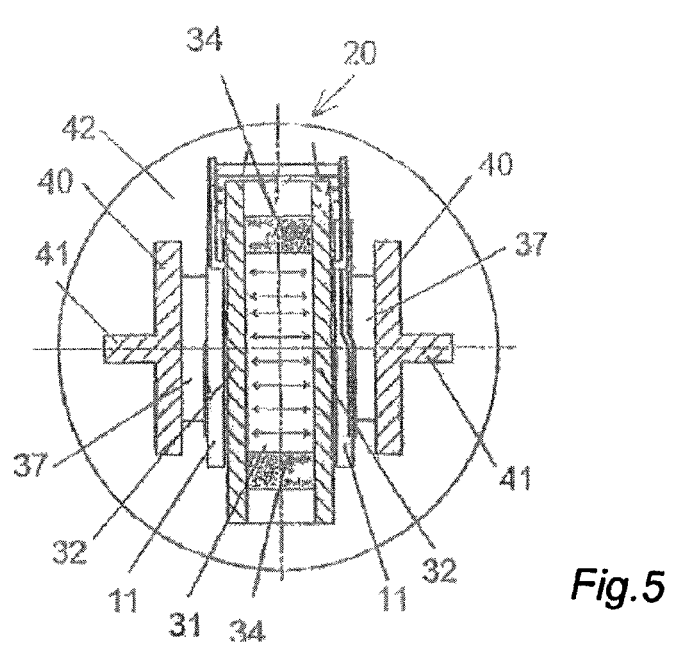

MAGNETIC INDUCTIVE FLOW METER HAVING MAGNETIC POLES DISTRIBUTING UNIFORM MAGNETIC FIELD LINES OVER THE ENTIRE POLE SURFACE

This nonprovisional application is a continuation of International Application No. PCT/EP2010/003503, which was filed on Jun. 11, 2010, and which claims priority to U.S. patent application Ser. No. 12/457,483, which was filed on Jun. 12, 2009, and to German Patent Application Nos. DE 20 2009 017 274.0, which was filed in Germany on Dec. 19, 2009, and to DE 20 2009 017 275.9, which was filed in Germany on Dec. 19, 2009, and which are all herein incorporated by reference.

BACKGROUND OF THE INVENTION

1. Field of the Invention

The invention relates to magnetic inductive flow meters.

2. Description of the Background Art

Magnetic inductive flow meters use a measuring method that is based on Faraday's law of electromagnetic induction. The first basis for the magnetic inductive measurement of the flow velocity of fluids was reported in 1832 in a publication by Michael Faraday. Modern electronic switching technology in conjunction with alternating magnetic fields made it possible to overcome the separation of the useful signals, proportional to the flow velocity, from interference signals, which occur in electrochemical processes during the generation of the magnetic field at the electrodes used for signal decoupling. Thus, nothing seemed to stand in the way of the wide industrial use of magnetic inductive flow meters.

The measuring principle of magnetic inductive flow meters utilizes the separation of moving charges in a magnetic field. The conductive fluid to be measured flows through a tube which is made of nonmagnetic material and whose interior is electrically insulated. A magnetic field is applied from the outside by means of coils. The charge carriers present in the conductive fluid, such as ions and other charged particles, are deflected by the magnetic field: the positive charge carriers to one side and the negative charge carriers to another side. A voltage, which is detected with a measuring device, arises owing to the charge separation at measuring electrodes arranged perpendicular to the magnetic field. The value of the measured voltage is proportional to the flow velocity of the charge carriers and thereby proportional to the flow velocity of the measuring fluid. The flow volume can be determined over time by integration.

In magnetic fields generated by pure alternating voltage, induction of interference voltages occurs in the electrodes, which must be suppressed by suitable but costly filters. For this reason, the magnetic field is usually generated by a clocked direct current of alternating polarity. This assures a stable zero point and makes the measurement insensitive to effects by multiphase substances and inhomogeneities in the fluid. In this way, a usable measuring signal can also be achieved at a low conductivity.

If a measuring fluid moves through the measuring tube, according to the induction law a voltage is present at both measuring electrodes, which are arranged in the measuring tube perpendicular to the flow direction and perpendicular to the magnetic field. This voltage in the case of a symmetric flow profile and a homogeneous magnetic field is directly proportional to the average flow velocity. The inductive flow measuring method is capable of generating an electrically usable signal for further processing directly from the flow. The following equation basically applies:

$$U = k*B*D*v$$

where U=voltage, k=proportionality factor, B=magnetic field strength, D=tube diameter, and v=flow velocity.

A possible realization of a magnetic inductive flow meter is disclosed in U.S. Pat. No. 6,626,048 B1, which is incorporated herein by reference. This publication presents the physical and electronic fundamentals.

It is understood that major problems must be solved in the practical realization of a magnetic inductive flow meter.

In one respect, this is a matter of the material. The measuring tube must be amagnetic in order not to interfere with the magnetic field. The measuring tube further must be electrically insulating in order not to interfere with the picking up of the voltage with use of the electrodes. Moreover, the tube must have a food-safe material, when the liquid is a food, for example, drinking water.

These requirements can be fulfilled best when a food-safe plastic is used as the material. Nevertheless, plastics have the disadvantage of a much lower strength compared with metal. Resistance to internal pressure, however, is an essential requirement. The attempt to achieve internal pressure resistance with an increased thickness of the tube wall is not practicable, because otherwise the magnetic field would be weakened too greatly.

As mentioned above, the voltage at the measuring electrode is proportional to the magnetic field strength, provided that the magnetic field permeates the measuring channel homogeneously. U.S. Pat. No. 6,626,048 B1 disclosed a solution for a circular cylindrical measuring channel; this solution consisted of a magnetic coil with a magnetic core made of ferromagnetic electrical sheet steel and two magnetic poles coupled to the magnetic core and made of soft magnetic electrical sheet steel. Practical tests have shown, however, that satisfactory measurement results cannot be achieved with this arrangement. The reasons for this are the relatively long field lines and the high magnetic resistance in the electrical sheet steel, because the magnetic circuit is arranged around the electrodes.

SUMMARY OF THE INVENTION

It is therefore an object of the present invention to provide a magnetic inductive flow meter, which overcomes the aforementioned problems and provides an optimized measurement result.

A major advantage of the magnetic poles of the invention is the uniform distribution of the magnetic field lines over the entire pole surface, produced by the double web on the back of the magnetic poles. The distribution of the magnetic field lines can be influenced by skillful dimensioning of the double web. At the same time, the punched, bent, and folded part can be produced fully automatically and in large quantities.

According to an embodiment of the invention, the magnetic pole surfaces are triangular, and the magnetic poles formed therefrom rectangular. Elliptical magnetic poles are an alternative.

The double web produces additional advantages. If, according to an embodiment of the invention, the magnetic core of the electromagnets or in any event at its ends is formed flat, then it can be clamped between the double webs. The magnetic field lines generated in the electromagnets are distributed optimally in this way and without an attenuating air gap to both parts of the double web, which then transmits them further to the surface elements of the magnetic pole.

To facilitate the assembly of the magnetic core of the electromagnets, the ends of the double web can be splayed funnel-like.

To make possible the handling and positioning of the electromagnet, magnetic core, and magnetic poles, according to a refinement of the invention, a plastic holder is provided, which secures these parts in a clamping fashion.

According to a preferred embodiment, for this purpose, the plastic holder has an approximate U shape with a stable cross web at the head end, two short legs, two long legs parallel thereto, a groove between the long and short legs, matched to the thickness of the double web and magnetic core, and lateral guides, which ensure the correct position of the double web of the magnetic poles on the long leg.

This plastic holder has the advantage that the magnetic parts can be assembled using simple plug-in procedures. The combination of the plastic holder and magnetic parts can then be handled simply and securely and finally mounted in the magnetic inductive flow meter.

According to an embodiment, the long leg may end in a hook. This construction is of advantage when the housing of the magnetic inductive flow meter is formed matching thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a punched/bent/folded part made of electrical sheet steel for the production of a rectangular magnetic pole;

FIG. 2 is a magnetic pole produced therefrom;

FIG. 3 is a front view an electromagnet with a flat magnetic core and two magnetic poles according to FIG. 1, secured in a clamping manner in a plastic holder;

FIG. 4 is a side view to FIG. 3, and

FIG. 5 is the plastic holder of FIG. 3 equipped with the magnetic parts, inserted in a housing, cut crosswise, of a magnetic inductive flow meter.

DETAILED DESCRIPTION

FIG. 1 shows a punched/folded/bent part made of electrical sheet steel. Evident is a long elongate strip $11'$, on which triangular surface elements 10.1, 10.2 are formed with a mutual distance. A fold line 12 is provided on strip $11'$ between surface elements 10.1, 10.2. Bend lines 13 are provided between strip $11'$ and surface elements 10.1, 10.2.

FIG. 2 shows magnetic pole 10 resulting from the element of FIG. 1 by folding along line 12 and by bending along line 13. The two triangular surface elements 10.1, 10.2 complement each other to form a rectangular magnetic pole, the two surface elements 10.1, 10.2 also forming magnetic pole surfaces. The free ends of the double web 11 are splayed funnel-like. Other shapes are readily possible for the magnetic pole surfaces, e.g., rounded off, ovoid, etc.

A major advantage of this magnetic pole 10 apart from the simple production is the optimal conduction of the magnetic field through double web 11 to the pole surfaces 10.1, 10.2, where the pole surfaces 10.1, 10.2 are oriented perpendicular to the magnetic field. Furthermore, the flat ends of a magnetic core 27 of an electromagnet 26 (FIGS. 3 and 4) can be clamped between double web 11, so that the magnetic fields generated by electromagnet 26 reach the pole surfaces optimally and without an interfering air gap.

FIG. 3 shows electromagnet 26 with a flat magnetic core 27, whose ends are clamped between double webs 11 of two magnetic poles 10. Magnetic parts 10, 27 are in turn secured in a clamping manner in a plastic holder 20. Plastic holder 20 has an approximate U shape with a stable cross web 21 at the head end, two short legs 22, two long legs 23 parallel thereto, a groove between the two legs 22, 23, matched to double web 11 and magnetic core 27, and lateral guides 24, which ensure the correct position of double web 11 on long leg 23. The lateral guides 24 are formed by tabs that extend from each of the long legs 23. The lateral guides 24 will abut the double web 11 during positioning of the double web 11 on the long legs 23.

The alternating magnetic field generated in magnetic coil 26 is transferred via magnetic core 27 over a large area to double webs 11 and from these to magnetic poles 10, by which the homogeneous magnetic field symbolized by double arrows is generated.

FIG. 4 shows the device of FIG. 3 as a side view. Magnetic core 27 can be seen clamped between double web 11 and double web 11 clamped between legs 22, 23. Further, at the lower end of long leg 23 a formed hook 25 can be seen, which corresponds to a corresponding counterpart on the housing of a magnetic inductive flow meter.

FIG. 5 shows plastic holder 20 of FIGS. 3 and 4 with the mounted magnetic parts 10, 26, 27, placed in a housing of a magnetic inductive flow meter, which is shown as a cross section. The magnetic inductive flow meter has a rectangular measuring channel 31 with long side walls 32, against whose outer side magnetic poles 10 abut, in order to generate the homogeneous magnetic field symbolized by double arrows in the interior of measuring channel 31. Evident, further, is one of electrodes 34 which is placed in measuring channel 31; these electrodes are oriented perpendicular to the magnetic field and a measuring voltage can be picked up at them, which is proportional to the flow to be measured.

FIG. 5, furthermore, shows in cross section an outer reinforcement cage for the housing, having two parallel, here perpendicularly oriented first longitudinal ribs 40 and two second longitudinal ribs 41 perpendicular thereto. Both longitudinal ribs 40, 41 end in a transverse partition 42, at whose back there is an inlet or outlet connecting piece (not visible here) for the measuring fluid. Magnetic coil 26 is positioned next to one of the two electrodes 34, namely, as close as possible. As a result, the magnetic path from magnetic coil 26 via magnetic core 27 and double web 11 to the magnetic pole surfaces becomes very short and electrode 34 remains freely accessible to pick up the measuring voltage.

Finally, an inner transverse partition 37, which transfers the pressure exerted by the internal pressure in measuring channel 31 on channel walls 32 to outer cage 40, 41, is seen between walls 32 of measuring channel 31 and first longitudinal ribs 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic inductive flow meter with a pressure-resistant plastic housing and a measuring unit comprising:
   a measuring channel having a rectangular cross section through which the measuring fluid flows;
   a channel wall;
   two opposing magnetic poles at the channel wall;
   an electromagnet with a magnetic coil and magnetic core configured to generate an alternating magnetic field; and
   two opposing measuring electrodes in the channel wall,
   wherein the magnetic poles are made of an electrical sheet steel in the form of an elongate strip with mutually spaced-apart surface elements,
   wherein the elongate strip forms a double web,
   wherein the surface elements form magnetic pole surfaces,
   wherein the double web and the magnetic pole surfaces form the magnetic pole, and
   wherein the double web is located on the back of the magnetic pole.

2. The magnetic inductive flow meter according to claim 1, wherein the magnetic coil is positioned next to one of the measuring electrodes and wherein the double web runs diagonal to the magnetic pole surfaces.

3. The magnetic inductive flow meter according to claim 1, wherein the surface elements are triangular, wherein the magnetic pole surfaces form a rectangle, and wherein the double web is perpendicular to the magnetic pole surfaces.

4. The magnetic inductive flow meter according to claim 1, wherein the surface elements are rounded off, wherein the magnetic pole surfaces form an ellipse, and wherein the double web is perpendicular to the magnetic pole surfaces.

5. The magnetic inductive flow meter according to claim 1, wherein the magnetic core of the electromagnet is flat and clamped between the double webs.

6. The magnetic inductive flow meter according to claim 1, wherein the ends of the double web are splayed funnel-like.

7. The magnetic inductive flow meter according to claim 1, wherein a plastic holder secures the magnetic coil, the magnetic core, and the magnetic poles in a clamping fashion.

8. The magnetic inductive flow meter according to claim 7, wherein the plastic holder has an approximate U shape with a stable cross web at the head end, two short legs, two long legs parallel thereto, and a groove between the two legs matched for a clamping fastening of the double web and magnetic core.

9. The magnetic inductive flow meter according to claim 7, wherein lateral guides ensure the correct position of the double web on the long leg.

10. The magnetic inductive flow meter according to claim 7, wherein the long legs end in a hook.

* * * * *